(12) United States Patent
Mittal et al.

(10) Patent No.: US 8,135,405 B2
(45) Date of Patent: Mar. 13, 2012

(54) EFFICIENT SEARCH FOR WIRELESS NETWORKS WHILE MINIMIZING PAGE LOSS

(75) Inventors: Vineet Mittal, San Diego, CA (US); Bhupesh Manoharlal Umatt, San Diego, CA (US); Nilotpal Dhar, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 1064 days.

(21) Appl. No.: 11/469,152

(22) Filed: Aug. 31, 2006

(65) Prior Publication Data

US 2008/0057948 A1  Mar. 6, 2008

(51) Int. Cl.
*H04Q 7/20* (2006.01)

(52) U.S. Cl. ..................... 455/435.2; 455/434

(58) Field of Classification Search .................. 455/434, 455/435.2, 435.1, 426.1; 340/426.21
See application file for complete search history.

(56) References Cited

U.S. PATENT DOCUMENTS

| | | | |
|---|---|---|---|
| 6,075,988 A | 6/2000 | Anderson | |
| 2005/0079870 A1 | 4/2005 | Rick | |

FOREIGN PATENT DOCUMENTS

| | | |
|---|---|---|
| KR | 20060007010 A | 1/2006 |
| WO | 0059255 | 10/2000 |

OTHER PUBLICATIONS

Written Opinion—PCT/US2007/077074, International Search Authority—European Patent Office—Mar. 12, 2008.
Samsung, T-Mobile, Motorola, Alignment to CN1 terminology of "Selected PLMN",3GPP TSG RAN2#46 R2-050337, Feb. 14, 2005, URL,http://ftp.3gpp.org/ftp/tsg_ran/WG2_RL2/TSGR2_46/Documents/R2-050337.zip.
Taiwan Search Report—TW096132378—TIPO—May 28, 2011.
International Search Report—PCT/US07/077074, International Search Authority, European Patent Office—Mar. 12, 2008.
Harri Holma, Antti Toskala: "wcdma for umts" Jul. 1, 2006, Wiley, England, XP002468396.

*Primary Examiner* — Charles Shedrick
(74) *Attorney, Agent, or Firm* — Kenyon S. Jenckes; Sayed H. Beladi

(57) ABSTRACT

Techniques to efficiently search for wireless networks while minimizing page loss are described. An available search time that excludes paging periods is determined. A search for cells in wireless networks is performed during the available search time. Pertinent information is obtained for cells acquired during the search. The pertinent information may be dependent on the type of search being performed. For a manual search to find detectable wireless networks, the pertinent information for each acquired cell may be network identifier information. For an automatic search to find higher priority wireless networks, the pertinent information for each acquired cell in a higher priority wireless network may be system information used to select that cell. The search may be suspended prior to a paging period. State information for the search may be saved prior to suspending the search. The search may be resumed using the saved state information at the end of the paging period.

29 Claims, 8 Drawing Sheets

EFFICIENT SEARCH FOR WIRELESS NETWORKS WHILE MINIMIZING PAGE LOSS

BACKGROUND

I. Field

The present disclosure relates generally to communication, and more specifically to techniques for searching for wireless communication networks.

II. Background

Wireless communication networks are widely deployed to provide various communication services such as voice, packet data, broadcast, messaging, and so on. These wireless networks may be capable of supporting communication for multiple users by sharing the available network resources. Examples of such wireless networks include Code Division Multiple Access (CDMA) networks, Time Division Multiple Access (TDMA) networks, Frequency Division Multiple Access (FDMA) networks, and Orthogonal FDMA (OFDMA) networks. These wireless networks may also utilize various radio technologies such as Wideband-CDMA (W-CDMA), cdma2000, and Global System for Mobile Communications (GSM), which are known in the art.

A wireless device (e.g., a cellular phone) may be capable of communicating with different wireless networks. The wireless device may perform a search to find wireless networks from which the device can obtain service. The search may be triggered when (a) the wireless device is not in service, e.g., at power on, (b) a user wants to obtain a list of available wireless networks, or (c) the wireless device is currently communicating with a wireless network that is not the highest priority wireless network. It is desirable to perform the search as efficiently as possible so that the wireless device can obtain service from a suitable wireless network, perform other necessary tasks, or go to sleep and conserve battery power.

There is therefore a need in the art for techniques to efficiently search for wireless networks.

SUMMARY

Techniques to efficiently search for wireless networks to minimize page loss are described herein. The techniques also efficiently utilize the available search time in order to expedite the search.

In an embodiment, an available search time that excludes paging periods is initially determined. The paging periods are time periods during which pages are potentially received. A search for cells in wireless networks is performed during the available search time. Pertinent information is obtained for cells acquired during the search. The pertinent information may be dependent on the type of search being performed and the wireless network type, e.g., Universal Mobile Telecommunication System (UMTS), cdma2000, GSM, etc. For a manual search to find detectable wireless networks, the pertinent information for each acquired cell may be network identifier information, which for UMTS may be obtained from a master information block (MIB) transmitted by the cell. For an automatic search to find higher priority wireless networks, pertinent information may be obtained for each acquired cell in a higher priority network. The pertinent information may be system information used to select that cell, which for UMTS may be obtained from system information block types 1 and 3 (SIB1 and SIB3) broadcast by the cell. The pertinent information may be obtained from other sources in other types of wireless network.

The search may involve a number of tasks. Prior to performing a task, a determination may be made whether sufficient time remains for that task. The task may be performed if sufficient time is available and may be delayed otherwise. The search may be suspended prior to a paging period. State information for the search may be saved prior to suspending the search. The search may be resumed using the saved state information at the end of the paging period. State information for a serving cell may also be saved prior to performing or resuming the search. The serving cell may be quickly reacquired using the saved state information prior to each paging period to monitor for pages.

Various aspects and embodiments of the disclosure are described in further detail below.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The search techniques described herein may be used for various wireless communication networks such as UMTS networks, GSM networks, cdma2000 networks, and so on. The terms "network" and "system" are often used interchangeably. A GSM network utilizes GSM for air interface and Mobile Application Part (MAP) for core network. A UMTS network utilizes W-CDMA for air interface and MAP for core network. The terms "air interface", "radio technology" and "radio access technology" are often used interchangeably. The terms "W-CDMA" and "UMTS" are also often used interchangeably. W-CDMA and GSM are described in documents from an organization named "3rd Generation Partnership Project" (3GPP). cdma2000 is described in documents from an organization named "3rd Generation Partnership Project 2" (3GPP2).

In general, a wireless network may utilize any radio technology such as W-CDMA, GSM, cdma2000, or some other radio technology. A network operator/service provider may deploy one or more wireless networks of one or more radio technologies. For clarity, the search techniques are described below for UMTS. Hence, UMTS terminology is used in much of the description below.

Figure 1:
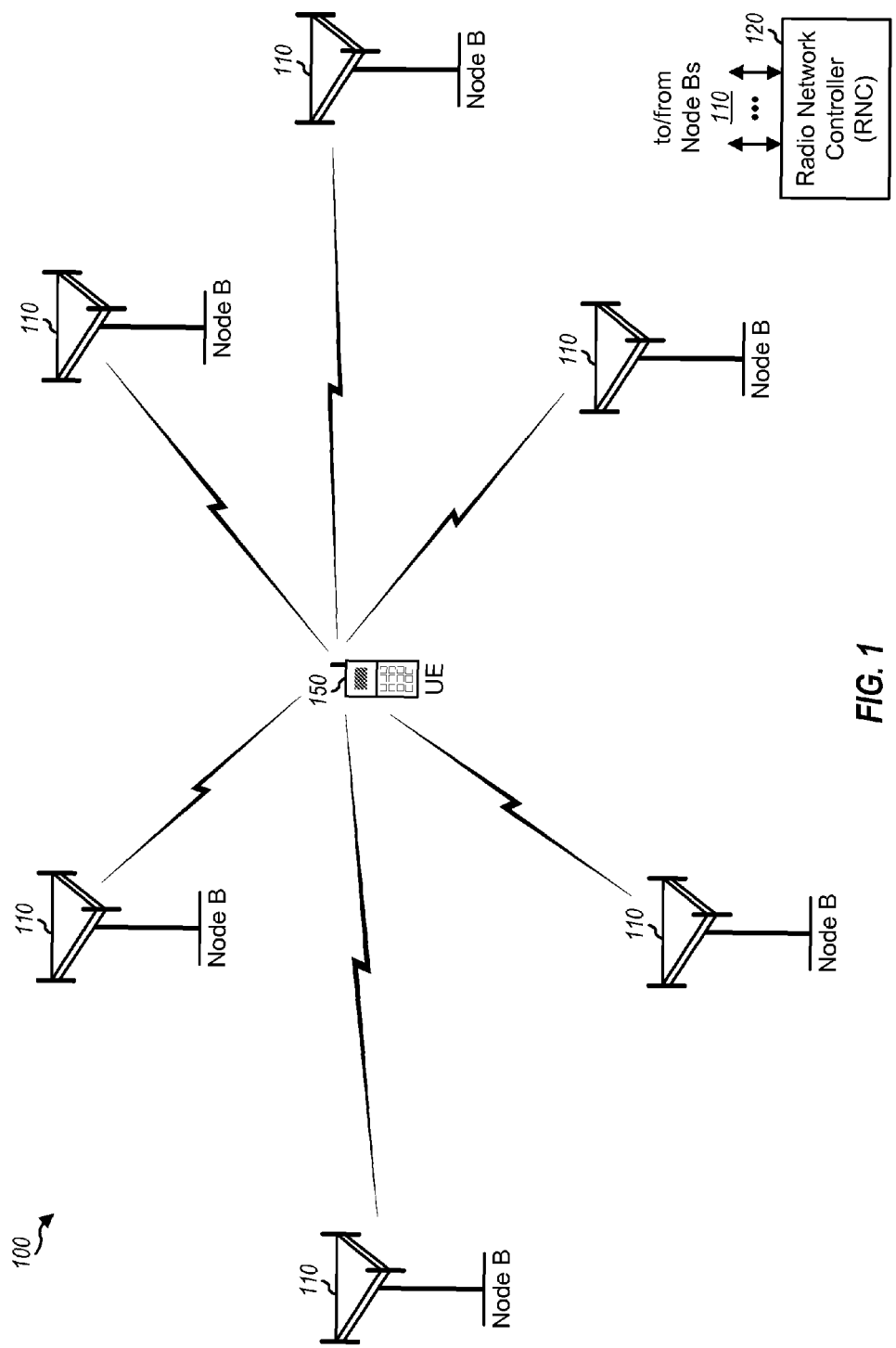
FIG. 1 shows a UMTS network.

FIG. 1 shows a UMTS network 100 that includes a number of Node Bs 110. A Node B is a fixed station that communicates with the user equipments (UEs) and may also be called a base station, a base transceiver station (BTS), an access point, and so on. A radio network controller (RNC) 120 couples to Node Bs 110 and provides coordination and control for these Node Bs. A wireless network typically includes many cells, where the term "cell" can refer to a Node B or the coverage area of the Node B, depending on the context in which the term is used.

A UE 150 may communicate with one or more Node Bs 110 on the downlink and/or uplink at any given moment. UE 150 may be stationary or mobile and may also be called a mobile station (MS), a mobile equipment (ME), a terminal, a station (STA), and so on. UE 150 may be a cellular phone, a personal digital assistant (PDA), a wireless modem, a wireless communication device, a subscriber unit, and so on. The downlink (or forward link) refers to the communication link from the Node Bs to the UEs, and the uplink (or reverse link) refers to the communication link from the UEs to the Node Bs.

UMTS network 100 may belong in a public land mobile network (PLMN). A PLMN may comprise one or more wireless networks, e.g., one or more UMTS networks and/or one or more GSM networks. A PLMN is uniquely identified by a specific Mobile Country Code (MCC) and a specific Mobile Network Code (MNC). The UMTS networks for a given PLMN may have overlapping or non-overlapping coverage areas. Multiple PLMNs may also be deployed by different service providers in a given geographic area.

UE 150 may be provisioned with a list of preferred PLMNs from which the UE may receive service. This preferred list may be provisioned by a service provider with which the UE has a subscription. The preferred list normally includes a home PLMN (HPLMN) and other PLMNs for which the service provider has roaming agreements. The preferred list may be stored in a Subscriber Identity Module (SIM), a Universal SIM (USIM), or some other non-volatile memory module. The UE may also maintain a list of PLMNs that the UE has found during prior searches. This list of found PLMNs may be stored in an acquisition database in a non-volatile memory.

Figure 2:
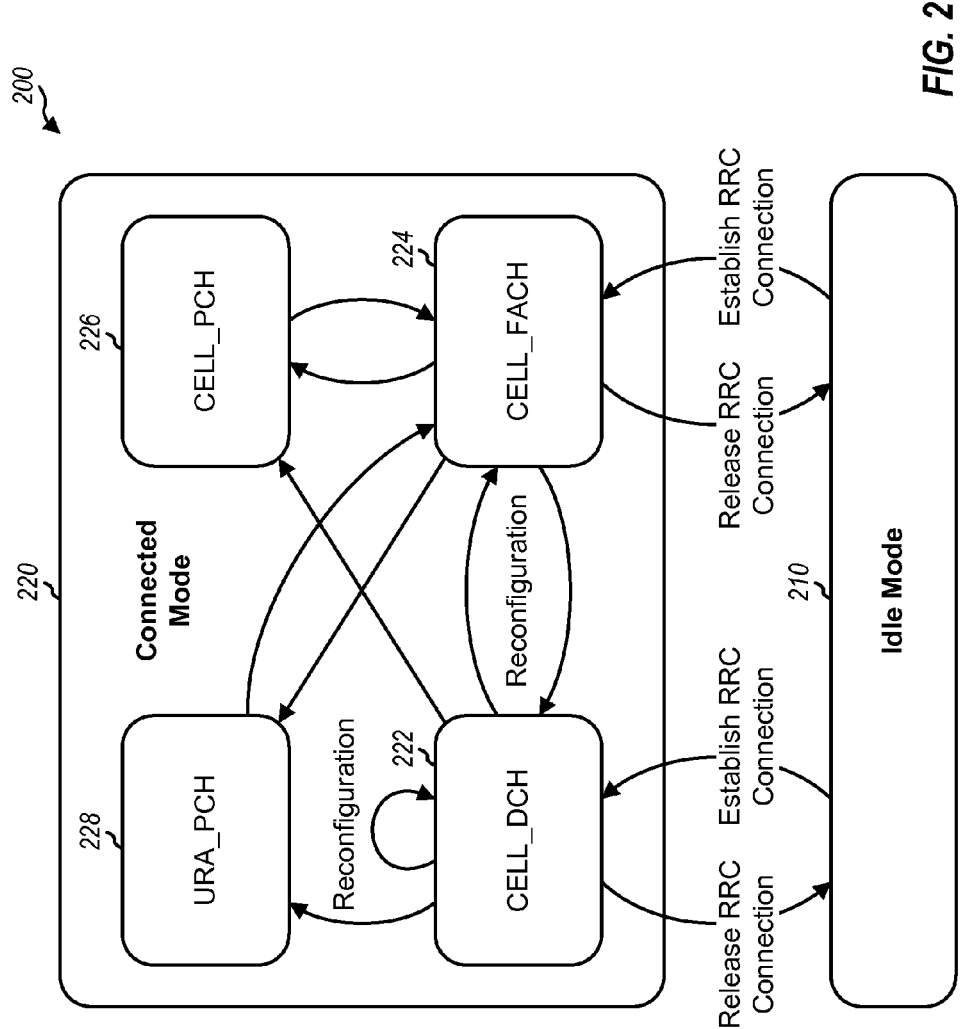
FIG. 2 shows a state diagram of Radio Resource Control (RRC) states.

FIG. 2 shows a state diagram 200 of Radio Resource Control (RRC) states for the UE. Upon being powered on, the UE performs cell selection to find a suitable cell from which the UE can receive service. This cell is referred to as the serving cell. Thereafter, the UE may transition to an Idle mode 210 or a Connected mode 220 depending on whether there is any activity for the UE. In the Idle mode, the UE has registered with the UMTS network, listens for paging messages, and updates its location with the UMTS network when necessary. The terms "paging messages," "page messages," and "pages" are used interchangeably herein. In the Connected mode, the UE can receive and/or transmit data depending on its RRC state and configuration.

In the Connected mode, the UE may be in one of four possible RRC states—a CELL_DCH state 222, a CELL_FACH state 224, a CELL_PCH state 226, or a URA_PCH state 228. The CELL_DCH state is characterized by (1) dedicated physical channels allocated to the UE for the downlink and uplink and (2) a combination of dedicated and shared transport channels being available to the UE. The CELL_FACH state is characterized by (1) no dedicated physical channels allocated to the UE, (2) a default common or shared transport channel assigned to the UE for use to access the UMTS network, and (3) the UE continually monitoring a forward access channel (FACH) for signaling such as Reconfiguration messages. The CELL_PCH and URA_PCH states are characterized by (1) no dedicated physical channels allocated to the UE, (2) the UE periodically monitoring a paging channel (PCH) for pages, and (3) the UE not being permitted to transmit on the uplink. The modes and states for the UE are described in 3GPP TS 25.331, entitled "Radio Resource Control (RRC); Protocol Specification," Release 7, June 2006, which is publicly available.

While in the Connected mode, the UMTS network can command the UE to be in one of the four RRC states based on activity of the UE. The UE may transition (1) from the CELL_DCH or CELL_FACH state to the Idle mode by performing a Release RRC Connection procedure, (2) from the Idle mode to the CELL_DCH or CELL_FACH state by performing an Establish RRC Connection procedure, (3) between the CELL_DCH and CELL_FACH states by performing a reconfiguration procedure, and (4) between different configurations in the CELL_DCH state by also performing a reconfiguration procedure. These procedures are described in 3GPP TS 25.331.

Figure 3:
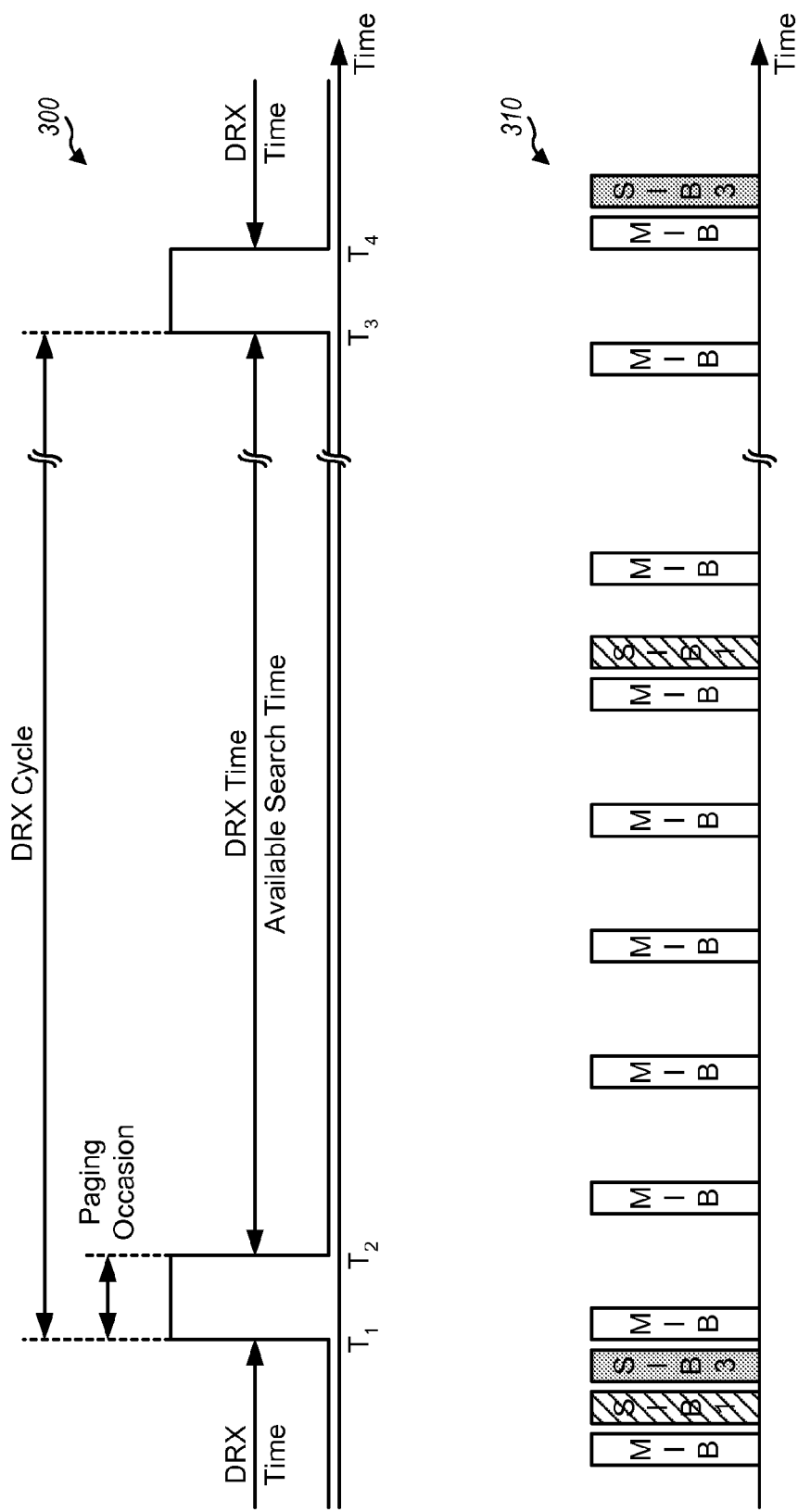
FIG. 3 shows operation in a discontinuous reception (DRX) mode.

FIG. 3 shows a timeline 300 for the UE while in a DRX mode of operation. The system timeline is divided into radio frames. Each radio frame has a duration of 10 milliseconds (ms) and is identified by a 12-bit system frame number (SFN). The SFN is reset to 0 at a specific time, incremented by one for each frame thereafter, and reset to zero after reaching the maximum value of 4095.

The UE may operate in the DRX mode while in the Idle mode, the CELL_PCH state, or the URA_PCH state. The DRX mode is also referred to as slotted mode paging. In the DRX mode, the UE is assigned paging occasions, which are specific radio frames in which the UE can receive pages. The paging occasions are also referred to as paging periods, paging frames, and so on. The paging occasions for the UE are separated by a time interval called a DRX cycle. The DRX cycle is configurable for the UE and can range from 80 ms to 5.12 seconds, or from 8 radio frames to 512 radio frames, but is typically equal to 1.28 seconds. The paging occasions for the UE are determined based on several parameters such as an International Mobile Subscriber Identifier (IMSI) that is unique for the UE.

The UE may wake up periodically during its paging occasions to receive any pages sent to the UE. Pages are not sent to the UE outside of the paging occasions. The UE may thus go to sleep during the time between its paging occasions if there are no other tasks to perform. The UE may power down as much circuitry as possible while asleep in order to conserve battery power.

The UE may perform a manual search or an automatic search to look for PLMNs. The UE may perform a manual search whenever requested by a user. A goal of the manual search is to return a comprehensive list of all PLMNs found by the UE to the user. The UE may periodically perform an automatic search if it is camping on a PLMN that is of lower priority than the home PLMN. A goal of the automatic search is to find a PLMN of higher priority than the serving PLMN. The UE may perform an automatic search whenever a timer expires. The timer value may be provided by the service provider. Table 1 summarizes several key attributes of the manual and automatic searches.

TABLE 1

|  | Manual Search | Automatic Search |
| --- | --- | --- |
| When to perform a search | Whenever requested by the user. | Periodically whenever a timer expires and the UE is not on the highest priority PLMN. |
| Goal of | Find all PLMNs detected | Find a PLMN of higher priority |

TABLE 1-continued

|  | Manual Search | Automatic Search |
|---|---|---|
| search | by the UE. | than the serving PLMN. |
| Information to obtain | PLMN ID of all PLMNs found. | System information for higher priority cells found. |
| Source of information | Master information block (MIB) | MIB, SIB1 and SIB3 |

For both the manual and automatic searches, the UE may perform a search for UMTS networks (a UMTS search) and may also search for wireless networks of other radio technologies (e.g., a GSM search for GSM networks). The searches for wireless networks of other radio technologies are not described herein.

In UMTS, each cell broadcasts full system information in pieces using different system information blocks (SIBs). Each system information block carries certain system information for the cell and/or the PLMN and is broadcast at specific times. Different system information blocks may be broadcast at different rates or intervals ranging from approximately once every second to once every ten seconds. System information block type 1 (SIB1) carries domain information and timers and constants for the Idle and Connected modes. The domain information may convey, e.g., whether the cell supports packet-switched and/or circuit-switched calls, location area identity (LAI) information, etc. System information block type 3 (SIB3) carries cell identity, cell selection and reselection information, cell reservation information, cell access restriction information. The UE uses the cell reselection information to perform reselection from the serving cell to a new cell. The UE uses the cell reservation information to determine whether the new cell is barred. SIB3 may be sent at a rate of approximately once every second. Full system information is broadcast in SIB1 through SIB7 and SIB11 through SIB18.

Each cell also broadcast a master information block (MIB) that specifies which system information blocks are used by the cell and a schedule for these system information blocks. The MIB also carries the MCC and MNC of the PLMN to which the cell belongs. The cell broadcasts the MIB periodically every 80 ms on a primary common control physical channel (P-CCPCH). The MIB and SIBs are described in 3GPP TS 25.331.

FIG. 3 also shows an exemplary transmission 310 of the MIB, SIB1 and SIB3 by one cell. The MIB, SIB1 and SIB3 may be broadcast periodically at different rates and/or different times. A given paging occasion for the UE may overlap the MIB, SIB1 and/or SIB3.

The UE may periodically process the paging channel to receive pages sent to the UE. The UE may perform manual and/or automatic searches as background tasks whenever requested or triggered. Foreground tasks (e.g., receiving pages) have higher priority and are performed first. Background tasks have lower priority and are performed second, e.g., when no foreground tasks need to be performed. The UE may efficiently perform PLMN searches as background tasks, whenever possible, to minimize missing pages.

During a PLMN search, after successfully acquiring a cell, the UE may proceed with reading system information from the acquired cell to determine the PLMN to which the cell belongs. When reading the system information (or SIBs) of the acquired cell, there is no guarantee that the UE will not miss pages because the SIB scheduling for the acquired cell may overlap the paging occasions for the UE on the serving cell. Furthermore, the amount of time needed to read the SIBs may be longer than the DRX cycle of the UE. For example, reading SIB1 and SIB3 may require 1.28 seconds or longer whereas the shortest DRX cycle is 0.64 seconds.

For a manual search, the UE obtains PLMN identification (ID) for cells that can be acquired. The PLMN ID is given by the MCC and MNC. Each cell transmits the MCC and MNC of the PLMN to which the cell belongs in the MIB. In an embodiment, for the manual search, the UE receives only the MIB of the acquired cell to obtain the PLMN ID and does not receive the SIBs of the cell. Since the MIB is scheduled every 80 ms, the UE can read the MIB of the cell in the background. By reading only the MIB, the UE may be able to avoid missing pages during the manual search.

For an automatic search, the UE obtains pertinent system information for cells that can be acquired and which are of higher priority than the serving cell. For the automatic search, the UE obtains a PLMN search list containing PLMNs of higher priority than the serving PLMN. This PLMN search list may be determined based on the list of preferred PLMNs provisioned at the UE. In an embodiment, to minimize page loss, the UE reads the SIBs of an acquired cell only if this cell is of higher priority than the serving cell. After acquiring the cell, the UE determines whether the PLMN ID of the acquired cell (which is obtained from the MIB) is present in the PLMN search list. The UE reads the SIBs of the acquired cell if the PLMN of the acquired cell is in the PLMN search list and does not read the SIBs otherwise. This embodiment avoids unnecessary reading of the SIBs for cells that are unsuitable for selection by the UE.

In an embodiment, for an automatic search, after determining that the PLMN ID of the acquired cell is present in the PLMN search list, the UE does not read all of the SIBs broadcast by the cell. Rather, to minimize page loss, the UE reads only SIB1 and SIB3, which contain pertinent system information to determine cell suitability, e.g., LAI information, cell access restrictions, cell bar status, etc.

In an embodiment, the UE searches for PLMNs during the DRX time when the UE does not receive any pages from the serving cell. To minimize missing pages, the UE suspends the PLMN search during its paging occasions and receives the paging channel from the serving cell. This allows the UE to search for PLMNs while minimizing page loss.

In FIG. 3, one paging occasion for the UE occurs between times $T_1$ and $T_2$, and another paging occasion for the UE occurs between times $T_3$ and $T_4$. The DRX time for the UE is prior to time $T_1$, between times $T_2$ and $T_3$, and after time $T_4$. The DRX time is potentially available for a PLMN search, unless other tasks need to be performed. The UE may perform a PLMN search during the DRX time.

A PLMN may operate on one or more frequency bands. Each frequency band may cover multiple UMTS channels that may be spaced apart by approximately 5 MHz. The UMTS channels are also referred to as W-CDMA channels, frequency channels, etc. Each UMTS channel has a bandwidth of 3.84 MHz and a center frequency that is given in 200 KHz resolution. Each UMTS channel is identified by a specific channel number, which may be a UARFCN (UTRA absolute radio frequency channel number). The UARFCNs for various frequency bands are given in 3GPP TS 25.101, entitled "User Equipment (UE) radio transmission and reception (FDD)," Release 7, March 2006, which is publicly available. A UMTS network within a PLMN typically operates on one or more specific UARFCNs.

The UE may perform a frequency scan to detect for strong UARFCNs in a frequency band, as follows:

Perform a coarse frequency scan across the entire frequency band and measure the received power at coarse frequencies spaced apart by $\Delta f_C$, e.g., $\Delta f_C = 2$ MHz, Identify strong coarse frequencies,
Perform a fine frequency scan for a range of UARFCNs around each strong coarse frequency, and
Identify strong UARFCNs.

The UE may maintain an acquisition database that includes a list of unique UARFCN/PLMN entries for UMTS channels that have been previously acquired by the UE. Each UARFCN/PLMN entry may indicate a UARFCN, a scrambling code, and other pertinent information to acquire the associated UMTS channel. The acquisition database may include a predetermined number of (e.g., 10) most recent entries. These entries may be stored in a circular buffer so that a new entry replaces the oldest entry in the acquisition database.

The UE may perform a partial search for the UMTS channels in the acquisition database prior to performing a full search with a frequency scan. This may be desirable for several reasons. First, the UE has acquired these UMTS channels previously, so the likelihood of acquiring these UMTS channels again may be good. Second, the UE has pertinent information such as scrambling code and may be able to acquire these UMTS channels more quickly. Third, the UE may use the results of the partial search to reduce the frequency search space for the full search and/or to avoid acquisition attempts on UARFCNs where PLMNs cannot be present. The UE may also employ other techniques to identify UARFCNs where PLMNs are more likely to be found and to avoid UARFCNs where PLMNs are unlikely to be found.

Figure 4:
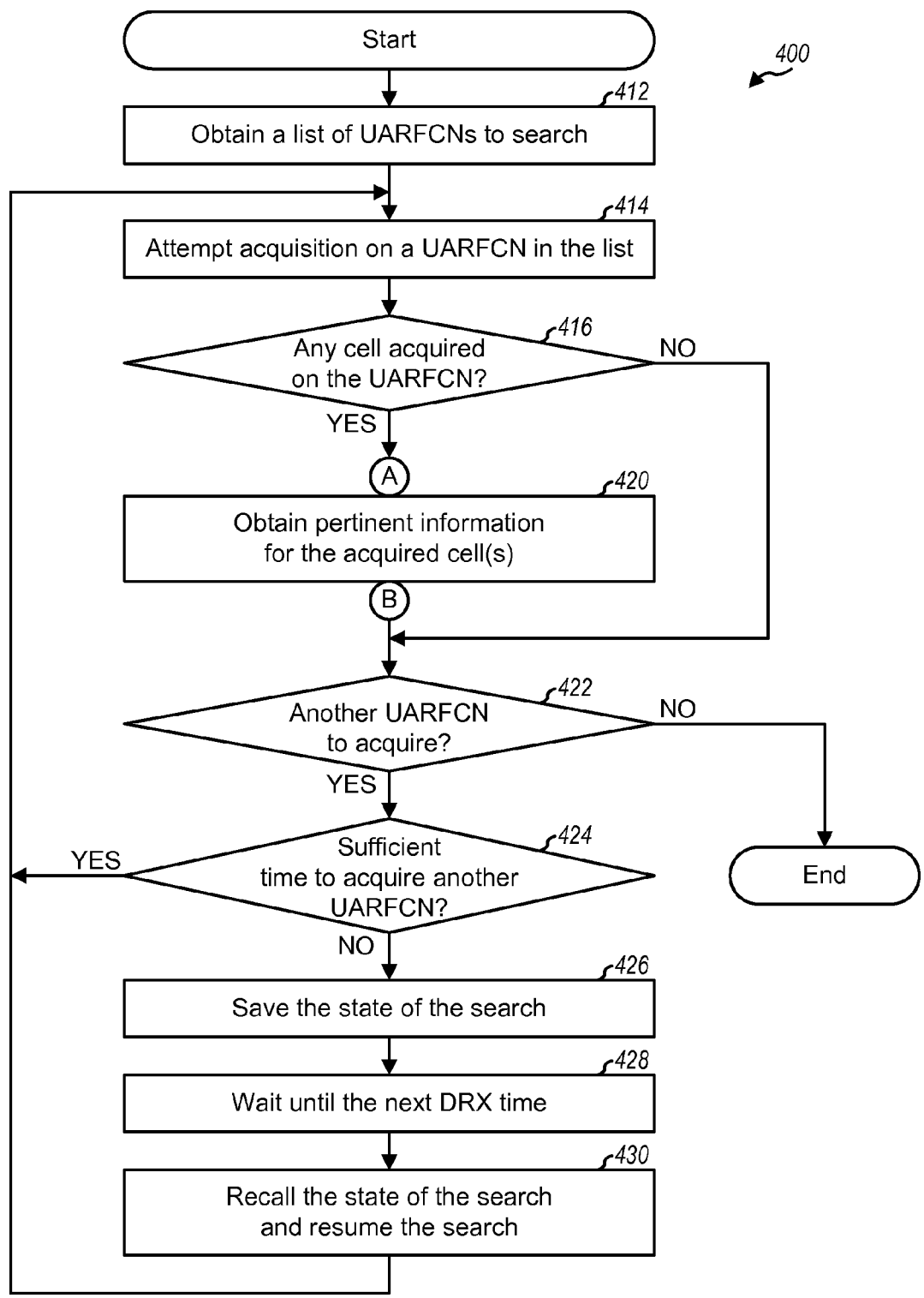
FIG. 4 shows a process to perform a PLMN search to minimize page loss.

FIG. 4 shows an embodiment of a process 400 for performing a PLMN search to minimize page loss. The PLMN search may be a manual search or an automatic search. A list of UARFCNs to search is initially obtained (block 412). For a manual search, this UARFCN list may be obtained from a frequency scan. For an automatic search, this UARFCN list may be obtained from a frequency scan or the acquisition database. For an automatic search, a PLMN search list containing higher priority PLMNs is also obtained (not shown in FIG. 4).

Acquisition is attempted on a UARFCN in the list, e.g., using a three-step process (block 414). In step one, the UE searches for a 256-chip primary synchronization code (PSC) sequence sent on a primary synchronization channel (SCH) by correlating the received samples at the UE with a locally generated PSC sequence at different time offsets. The UE uses the PSC to detect for the presence of a cell and to ascertain the slot timing of that cell. In step two, the UE determines a pattern of secondary synchronization code (SSC) sequences used by each cell for which the PSC has been detected. The UE can determine frame timing and a scrambling code group used for a cell based on the detected SSC pattern for that cell. In step three, the UE determines the scrambling code used by each cell for which the SSC pattern has been detected. Each SSC pattern is associated with a group of eight scrambling codes. The UE evaluates each of the eight scrambling codes to determine which scrambling code is used by the cell.

A determination is then made whether any cell has been acquired on the UARFCN (block 416). If the answer is 'Yes', then pertinent information may be obtained for the acquired cell(s) (block 420). Different types of information may be obtained for different types of search, as described below.

If the answer is 'No' for block 416, and also after block 420, a determination is made whether there is another UARFCN to acquire (block 422). If the answer is 'No', then the process terminates. Otherwise, a determination is made whether sufficient time remains before the next paging occasion to acquire another UARFCN (block 424). If the answer is 'Yes', then the process returns to step 414 to acquire another UARFCN in the list. Otherwise, if there is insufficient time, then the state of the search is saved (block 426). The UE waits until the next DRX time (block 428) and then recalls the state of the search and resumes the search (block 430). The UE then returns to block 414 to acquire the next UARFCN in the list.

Figure 5:
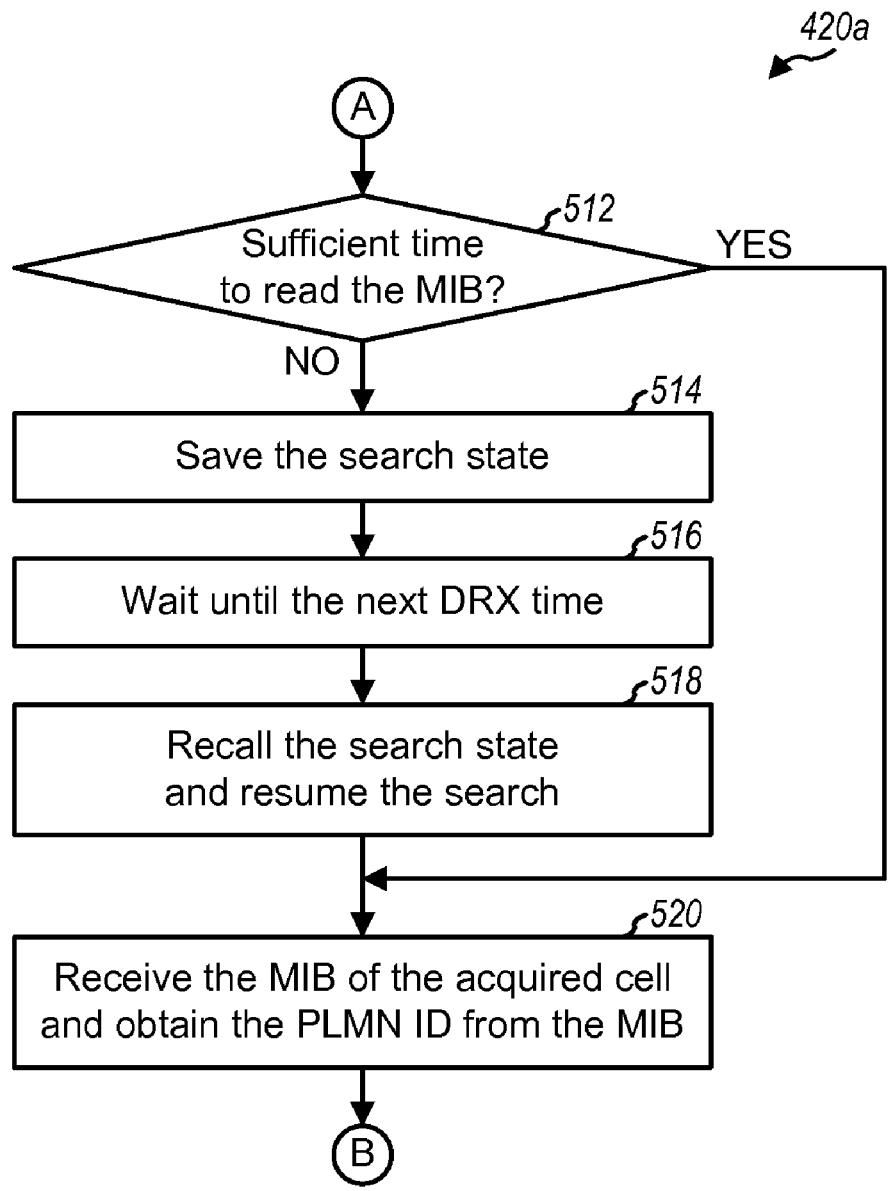
FIG. 5 shows a process to obtain pertinent information in a manual search.

FIG. 5 shows an embodiment of a process 420a for obtaining pertinent information for an acquired cell in a manual search. Process 420a is an embodiment of block 420 in FIG. 4 and may be performed for each cell acquired in block 414 in FIG. 4. A determination is initially made whether sufficient time remains before the next paging occasion to read the MIB of the acquired cell (block 512). If the answer is 'Yes', then the MIB of the acquired cell is received, and the PLMN ID of the PLMN for the cell is obtained from the MIB (block 520). The process then returns to block 422 in FIG. 4. Otherwise, if there is insufficient time and the answer is 'No' for block 512, then the search state is saved (block 514). The UE then waits until the next DRX time (block 516), then recalls the search state and resumes the search (block 518), and then receives the MIB of the acquired cell and obtains the PLMN ID (block 520).

In an embodiment, the UE attempts to read the MIB of the acquired cell for a predetermined time duration, which may be given by a predetermined number of MIB transmissions such as, e.g., 3 MIB transmission or 3×80 ms=240 ms. If the MIB is not received within the predetermined time duration, then the UE moves to the next cell/frequency. This embodiment avoids a scenario in which the UE indefinitely attempts to read the MIB but is not able to do so due to bad RF conditions or a spurious cell. The predetermined time duration avoids the UE getting stuck on this cell. The UE may initialize a timer to the predetermined time duration, set the timer prior to reading the MIB, and abort reading the MIB when the timer expires.

Figure 6:
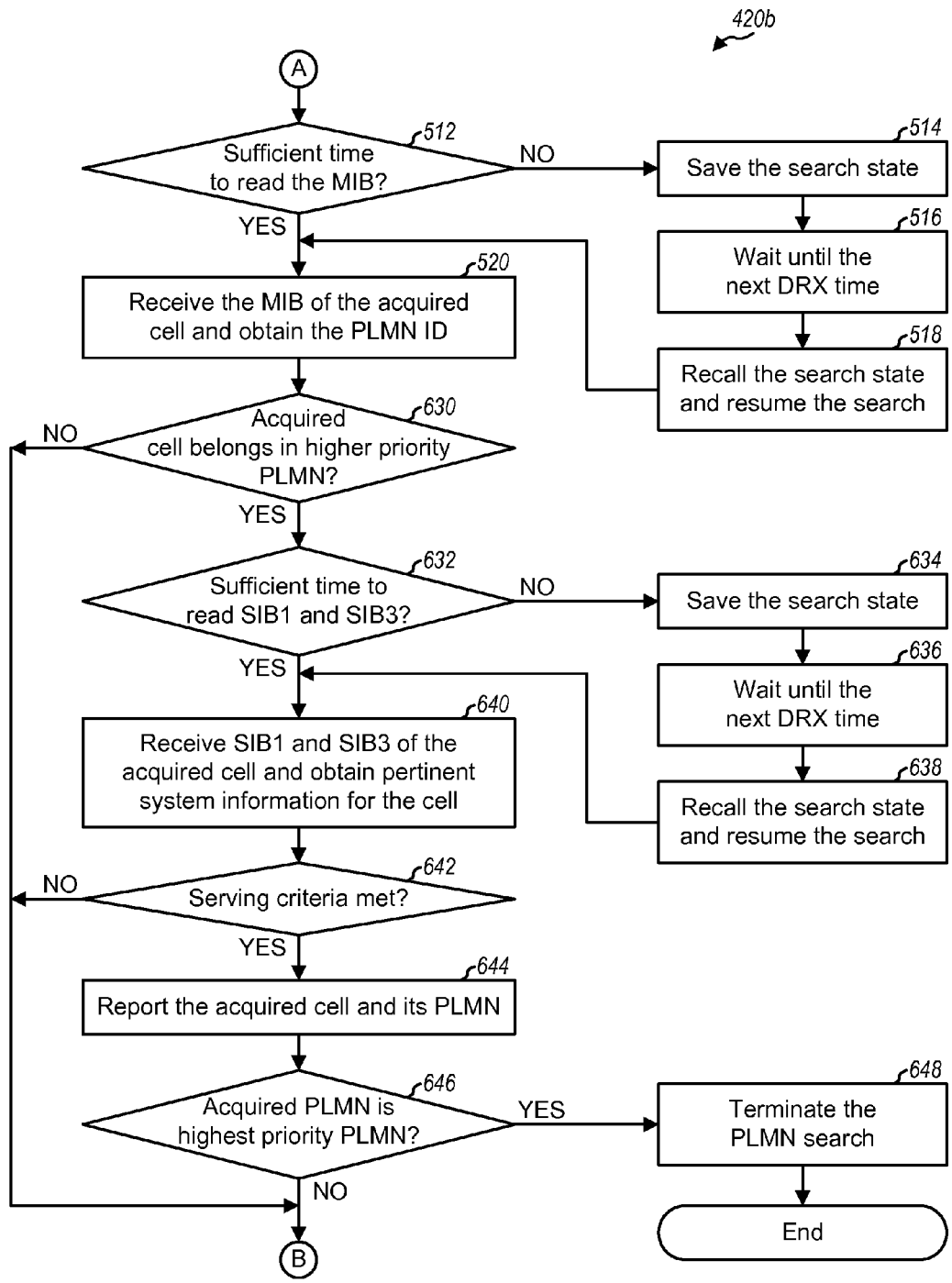
FIG. 6 shows a process to obtain pertinent information in an automatic search.

FIG. 6 shows an embodiment of a process 420b for obtaining pertinent information for an acquired cell in an automatic search. Process 420b is another embodiment of block 420 in FIG. 4 and may be performed for each cell acquired in block 414 in FIG. 4. Process 420b includes blocks 512, 514, 516, 518 and 520 to receive the MIB of the acquired cell and to obtain the PLMN ID from the MIB. A determination is then made whether the PLMN of the acquired cell (which is called the acquired PLMN) is present in the PLMN search list (block 630). If the answer is 'No', then the acquired cell is discarded, no system information is obtained for the cell, and the process returns to block 422 in FIG. 4.

If the acquired PLMN is present in the PLMN search list and the answer is 'Yes' for block 630, then system information is obtained for the acquired cell. This may be achieved in several manners. In the embodiment shown in FIG. 6, a determination is made whether sufficient time remains before the next paging occasion to read SIB1 and SIB3 of the acquired cell (block 632). If the answer is 'Yes', then SIB1 and SIB3 of the acquired cell are received, and the pertinent system information for the cell is obtained from these SIBs (block 640). Otherwise, if there is insufficient time, then the UE saves the search state (block 634), then waits until the next DRX time (block 636), then recalls the search state and resumes the search (block 638), and then receives SIB1 and SIB3 of the acquired cell and obtains the system information (block 640).

In another embodiment, after determining that the acquired PLMN is present in the PLMN search list, the UE receives SIB1 and SIB3 of the acquired cell without determining whether there is sufficient time. This embodiment may result in faster retrieval of system information for a higher priority cell and earlier selection to this cell. This embodiment may also reduce complexity since blocks 632 through 638 may be omitted. The tradeoff for these benefits is a potential lost of pages since the SIB reading may occur through paging occasions for the UE.

In any case, after receiving the system information for the acquired cell, the UE checks for the serving criteria based on the system information in SIB3 (block 642). The UE checks the serving criteria as if the UE is trying to camp on the acquired cell and determines whether selection of this cell as a new serving cell is allowed. If the serving criteria are met and the UE can camp on the acquired cell, then the cell and its PLMN are reported (block 644). Otherwise, if the serving criteria are not met, then the acquired cell is deemed as unsuitable and is discarded. Discarding this unsuitable cell may avoid unnecessary cell selection on a PLMN whose cell does not satisfy the serving criteria. This in turn may minimize page loss since the UE remains camped on the serving cell and does not attempt unnecessary cell selection when the serving criteria fail. If the answer is 'No' for block 642, then the process returns to block 422 in FIG. 4.

If the acquired cell is reported in block 644, then a determination is made whether the acquired PLMN is the highest priority PLMN in the PLMN list. If the answer is 'Yes', then the PLMN search is terminated (block 648), and the UE does not proceed with searching for other PLMNs. This may result in earlier selection to the newly acquired cell in the highest priority PLMN. Otherwise, if the acquired PLMN is not the highest priority PLMN, then the process returns to block 422 in FIG. 4.

In the embodiments shown in FIGS. 4 through 6, prior to performing a search task, the UE checks the amount of time remaining before the next paging occasion. If the remaining time is not sufficient to complete the search task, then the UE suspends the search and monitors for pages. This allows the UE to save battery power and minimize page loss.

The UE may save the state of the search whenever a paging occasion is about to occur, suspend the search during the paging occasion to receive the paging channel, and resume the search from where it was suspended after the end of the paging occasion. Different information may be saved for the search depending on the progress of the search when it is suspended. During a frequency scan, the UE may save information on strong UARFCNs that have been identified as well as coarse frequencies for which fine scans are to be performed. During a PLMN search, the UE may save information for UARFCNs on which acquisition has been performed, UARFCNs to attempt acquisition, cells to obtain the MIB, cells to obtain SIB1 and SIB3, frequencies of the acquired cells, and/or other information.

In an embodiment, the UE saves the state of the serving cell when performing the PLMN search. The state information for the serving cell may include timing information, frequency information, scrambling code, PLMN ID, system information blocks (e.g., cell reselection parameters), received signal strength, transmit diversity indicator, etc. Neighbor cell information (e.g., timing information, frequency information, scrambling code, etc.) may also be saved. The UE can quickly acquire the serving cell with the saved state information whenever the UE needs to receive the paging channel. For example, the timing information of the serving cell may be used to perform a search in a small window around a known reference position instead of doing a full step 1/2/3 search. This reduces the amount of time taken by the UE to return back to the serving cell to listen for pages and thus maximizes the available search time, In an embodiment, a functional interface is used between an RRC layer and a physical layer (instead of a command interface) in order to reduce software latency when performing search. The functional interface allows a check to be done in Layer 1 (L1) context itself. In a case where a search is not performed (e.g., when no manual or automatic search is triggered), the functional interface avoids context switching and may thus allow the UE to go to sleep earlier. The functional interface also checks if there is enough time to search before the next paging occasion. If not, then L1 may go to sleep immediately. This functional interface may result in more time being available for search tasks.

Figure 7:
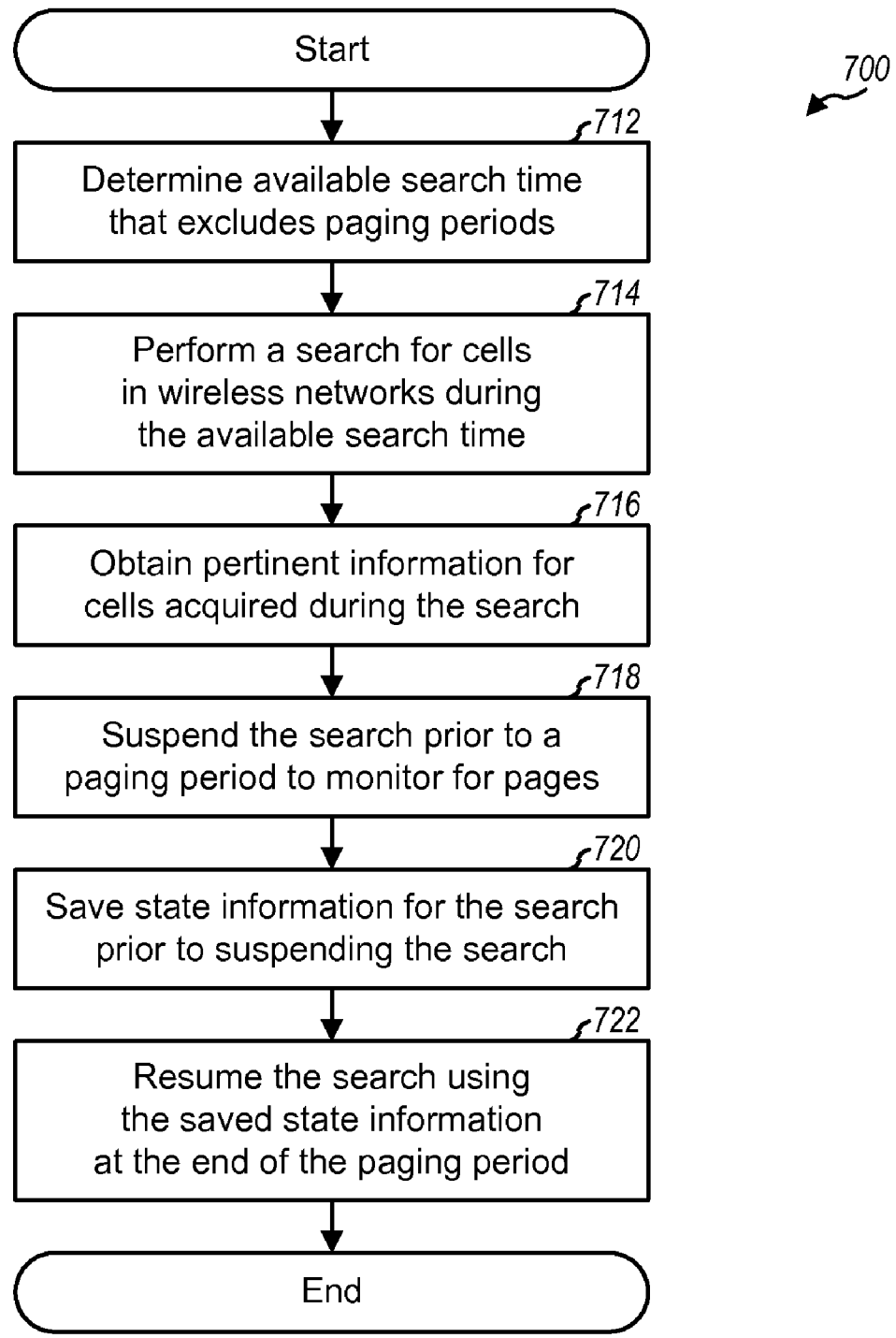
FIG. 7 shows a process to perform search for wireless networks.

FIG. 7 shows an embodiment of a process 700 for performing a search for wireless networks (e.g., PLMNs). Available search time that excludes paging periods is initially determined (block 712). The paging periods (or paging occasions) are time periods during which pages are potentially received. The available search time may be the DRX time minus whatever time used to perform other tasks. A search for cells in wireless networks is performed during the available search time (block 714). Pertinent information is obtained for cells acquired during the search (block 716). The pertinent information is determined by the type of search being performed.

For a manual search to find detectable wireless networks, the pertinent information for each acquired cell may be network identifier information, e.g., PLMN ID obtained from the MIB of the cell.

For an automatic search to find higher priority wireless networks, the MIB may be received for each cell acquired during the search. Whether an acquired cell is in a higher priority wireless network may be determined based on the MIB and a list of higher priority wireless networks. The pertinent information for each acquired cell in a higher priority wireless network may be system information used to select that cell. This system information may be obtained, e.g., from SIB1 and SIB3. The reception of SIB1 and SIB3 may be suspended if there is insufficient time prior to the next paging period. Alternatively, SIB1 and SIB3 may be received without suspension to monitor for pages. The serving criteria may be determined for each acquired cell for which system information is received. Only cells for which the serving criteria are satisfied may be reported. The search may be terminated after finding a cell in the highest priority wireless network.

The search may involve a number of tasks. Prior to performing a task, determination may be made whether sufficient time remains for the task. The task may be performed if sufficient time is available and may be delayed otherwise. The search may be suspended prior to a paging period to monitor for pages (block 718). State information for the search may be saved prior to suspending the search (block 720). The search may be resumed using the saved state information at the end of the paging period (block 722). State information for a serving cell may be saved prior to performing or resuming the search. The serving cell may be quickly reacquired using the saved state information, e.g., prior to each paging period.

Figure 8:
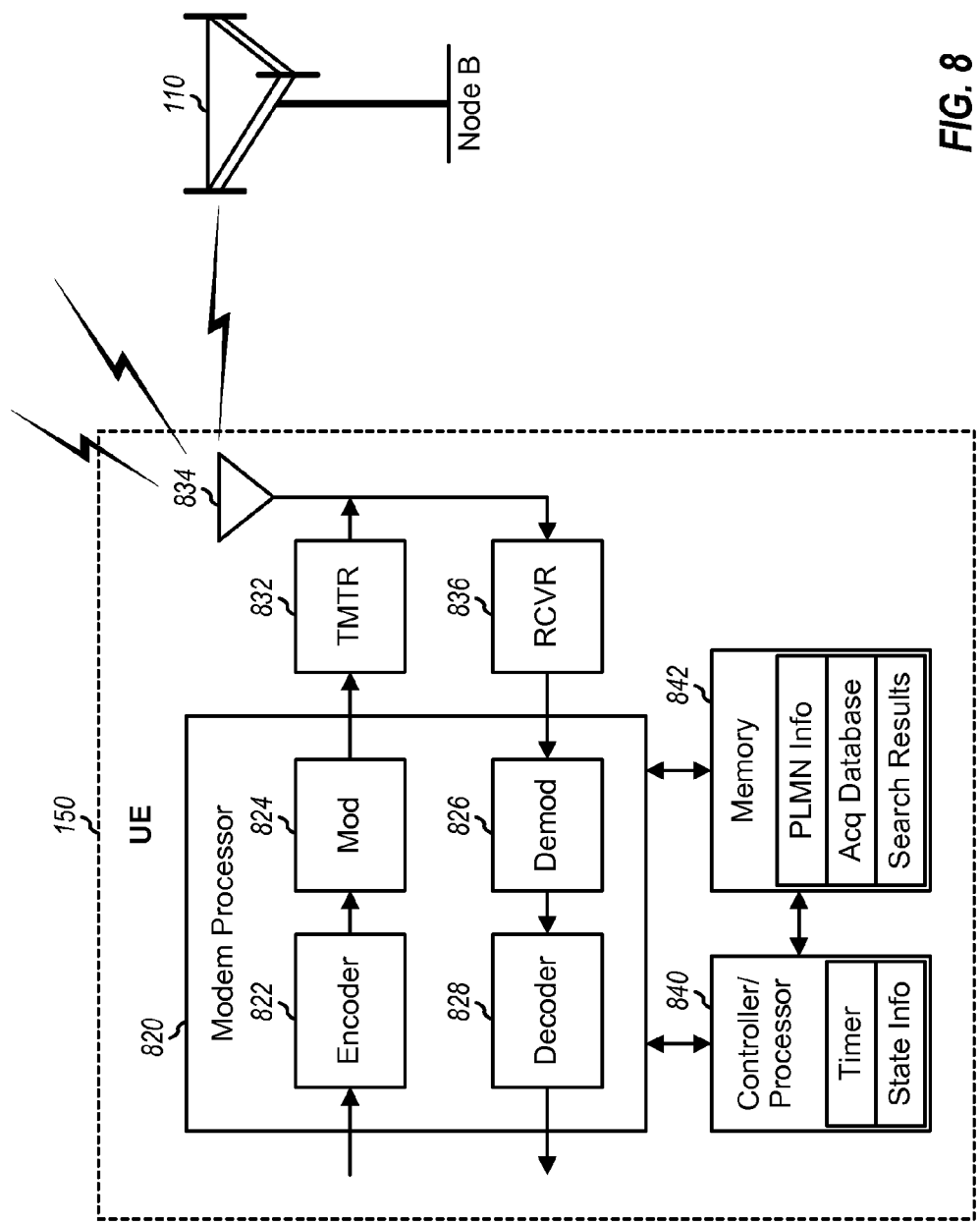
FIG. 8 shows a block diagram of a user equipment (UE).

FIG. 8 shows a block diagram of an embodiment of UE 150. On the uplink, data and signaling to be sent by UE 150 are processed (e.g., formatted, encoded, and interleaved) by an encoder 822 and further processed (e.g., modulated, channelized, and scrambled) by a modulator (Mod) 824 in accordance with an applicable radio technology (e.g., W-CDMA, GSM, or cdma2000) to generate output chips. A transmitter (TMTR) 832 then conditions (e.g., converts to analog, filters, amplifies, and frequency upconverts) the output chips and generates an uplink signal, which is transmitted via an antenna 834.

On the downlink, antenna 834 receives downlink signals transmitted by the Node Bs and provides a received signal. A receiver (RCVR) 836 conditions (e.g., filters, amplifies, frequency downconverts, and digitizes) the received signal and provides samples. A demodulator (Demod) 826 processes (e.g., descrambles, channelizes, and demodulates) the samples and provides symbol estimates. A decoder 828 further processes (e.g., deinterleaves and decodes) the symbol estimates and provides decoded data. Encoder 822, modulator 824, demodulator 826, and decoder 828 may be implemented by a modem processor 820. These units perform processing in accordance with the radio technology (e.g., W-CDMA, GSM, or cdma2000) used by the serving wireless network. For example, demodulator 826 may perform descrambling with scrambling sequences, despreading with orthogonal variable spreading factor (OVSF) codes, data demodulation, and so on, for W-CDMA. Demodulator 826 may perform matched filtering and equalization for GSM.

A controller/processor 840 controls the operation at UE 150. A memory 842 store data and program codes for UE 150. Controller/processor 840 may implement process 400 in FIG. 4, process 420a in FIG. 5, process 420b in FIG. 6, process 700 in FIG. 7, and/or other processes. Controller/processor 840 may determine when to perform PLMN searches and may also determine the PLMNs, frequency channels, and/or frequency bands to search. Controller/processor 840 may implement a timer to determine the DRX time and the available search time. Controller/processor 840 and/or memory 842 may store state information for a search that is in progress and/or state information for the serving cell. Memory 842 may store PLMN information, the acquisition database, search results, and so on.

For clarity, the search techniques have been specifically described for UMTS. These techniques may also be used for other wireless networks such as GSM networks, cdma2000 networks, wireless local area networks (WLANs), and so on. These techniques may also be used for two or more radio technologies, e.g., for W-CDMA and GSM, for W-CDMA and cdma2000, or for some other combination of radio technologies.

The search techniques described herein may be implemented by various means. For example, these techniques may be implemented in hardware, firmware, software, or a combination thereof. For a hardware implementation, the processing units used to perform searches may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the search techniques may be implemented with modules (e.g., procedures, functions, and so on) that perform the functions described herein. The firmware and/or software codes may be stored in a memory (e.g., memory 842 in FIG. 8) and executed by a processor (e.g., processor 840). The memory may be implemented within the processor or external to the processor.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. An apparatus configured to:
 determine, at a processor, an available search time that excludes paging periods during which a paging channel is monitored for pages;
 determine prior to a next future paging period whether the available search time is sufficient to perform at least a portion of a search for cells;
 perform the search for cells in wireless networks during the available search time; and
 obtain information for cells acquired during the search for cells, the information being determined by a type of search being performed and a wireless network type.

2. The apparatus of claim 1, further configured to:
 perform the search for cells to find detectable wireless networks; and
 obtain network identifier information for each cell acquired during the search for cells.

3. The apparatus of claim 2, further configured to:
 receive a master information block (MIB) for each cell acquired during the search for cells; and
 obtain the network identifier information from the MIB.

4. The apparatus of claim 1, further configured to:
 perform the search for cells to find higher priority wireless networks; and
 obtain system information for each cell acquired during the search for cells in a higher priority wireless network.

5. The apparatus of claim 4, further configured to:
 receive a master information block (MIB) for each cell acquired during the search for cells; and
 determine whether each acquired cell is in a higher priority wireless network, wherein a determination for a particular acquired cell is based on the MIB received from the particular acquired cell and a list of higher priority wireless networks.

6. The apparatus of claim 4, further configured to suspend receiving the system information for a particular acquired cell conditioned on there being insufficient time to receive the system information prior to a next paging period.

7. The apparatus of claim 4, further configured to receive the system information for a particular acquired cell without suspension to monitor the paging channel for pages.

8. The apparatus of claim 1, further configured to:
 perform the search for cells to find higher priority wireless networks; and
 receive system information block type 1 (SIB1) and system information block type 3 (SIB3) for each cell acquired during the search for cells in a higher priority wireless network.

9. The apparatus of claim 4, further configured to:
 determine serving criteria for each acquired cell for which system information is obtained; and
 report each acquired cell for which the serving criteria are satisfied.

10. The apparatus of claim 4, further configured to terminate the search for cells subsequent to finding a particular acquired cell in a highest priority wireless network.

11. The apparatus of claim 1, further configured to:
 suspend the search for cells prior to a paging period;
 monitor the paging channel for pages during the paging period;
 resume the search for cells after the paging period.

12. The apparatus of claim 11, further configured to:
 save state information for the search for cells prior to suspending the search for cells; and
 resume the search for cells using the saved state information at the end of the next future paging period.

13. The apparatus of claim 1, further configured to delay initiation of the search for cells in response to determining that the available search time is insufficient to complete the search for cells.

14. The apparatus of claim 1, further configured to:
  save state information for a serving cell prior to performing the search for cells; and
  reacquire the serving cell using the saved state information prior to the next future paging period.

15. The apparatus of claim 1, wherein performing the search for cells includes reading a master information block (MIB) of a particular acquired cell, reading a system information block type 1 (SIB1) of the particular acquired cell, reading a system information block type 3 (SIB3) of the particular acquired cell, or any combination thereof.

16. The apparatus of claim 1, wherein the portion of the search for cells is a partial search for Universal Mobile Telecommunications System (UMTS) channels, and wherein the partial search for UMTS channels is performed prior to performing a full search for cells that includes a frequency scan.

17. A method comprising:
  determining, at a processor, an available search time that excludes paging periods during which pages are potentially received;
  determining prior to a next paging period whether there is sufficient time to perform at least a portion of a search for cells;
  performing the search for cells in wireless networks during the available search time; and
  obtaining information for cells acquired during the search for cells, the information being determined by a type of search being performed and a wireless network type.

18. The method of claim 17, wherein performing the search for cells comprises performing the search for cells to find detectable wireless networks and wherein obtaining the information comprises obtaining network identifier information for each cell acquired during the search for cells.

19. The method of claim 17, wherein performing the search for cells comprises performing the search for cells to find higher priority wireless networks and wherein obtaining the information comprises obtaining system information for each cell acquired during the search for cells in a higher priority wireless network.

20. The method of claim 17, further comprising:
  suspending the search for cells prior to a paging period;
  monitoring for pages during the paging period; and
  resuming the search for cells after the paging period.

21. The method of claim 17, further comprising delaying initiation of the search for cells in response to determining that there is insufficient time to complete the search for cells.

22. An apparatus comprising:
  means for determining, at a processor, an available search time that excludes paging periods during which pages are potentially received;
  means for determining prior to a next paging period whether there is sufficient time to perform at least a portion of a search for cells;
  means for performing the search for cells in wireless networks during the available search time; and
  means for obtaining information for cells acquired during the search for cells, the information being determined by a type of search being performed and a wireless network type.

23. The apparatus of claim 22, further comprising:
  means for suspending the search for cells prior to a paging period;
  means for monitoring for pages during the paging period; and
  means for resuming the search for cells after the paging period.

24. The apparatus of claim 22, further comprising means for delaying initiation of the search for cells in response to determining that there is insufficient time to complete the search for cells.

25. A non-transitory processor readable medium comprising instructions that, when executed by a processor, cause the processor to:
  determine an available search time that excludes paging periods during which pages are potentially received;
  determine prior to a next paging period whether there is sufficient time to perform at least a portion of a search for cells;
  perform the search for cells in wireless networks during the available search time; and
  obtain information for cells acquired during the search, the information being determined by a type of search being performed and wireless network type.

26. The non-transitory processor readable medium of claim 25, further comprising instructions that when executed by the processor cause the processor to:
  suspend the search prior to a paging period;
  monitor for pages during the paging period; and
  resume the search after the paging period.

27. The non-transitory processor readable media of claim 25, further comprising instructions that when executed by the processor cause the processor to delay initiation of the search for cells in response to determining that there is insufficient time to complete the search for cells.

28. A method comprising:
  determining, at a processor, an available search time, wherein the available search time is a time duration between a first scheduled paging occasion and a second scheduled paging occasion;
  prior to beginning a search for one or more wireless networks, determining whether the search can be completed within the available search time;
  in response to determining that the search cannot be completed within the available search time, delaying beginning the search; and
  after delaying the search for the one or more wireless networks, performing the search for the one or more wireless networks, the search including:
    reading a first information block associated with a first wireless network of the one or more wireless networks;
    after reading the first information block, determining whether there is sufficient time to read a second information block associated with the first wireless network and to read a third information block associated with the first wireless network; and
    in response to determining that there is not sufficient time to read the second information block and the third information block, saving a state of the search and resuming the search at a next available search time.

29. The method of claim 28, wherein the first information block is a master information block (MIB), wherein the second information block is a system information block type 1 (SIB1), and wherein the third information block is a system information block type 3 (SIB3).

* * * * *